(12) United States Patent
Hamamura et al.

(10) Patent No.: US 7,852,401 B2
(45) Date of Patent: Dec. 14, 2010

(54) PHOTOGRAPHING APPARATUS AND PHOTOGRAPHING METHOD FOR EXPOSURE CONTROL DURING CONTINUOUS PHOTOGRAPHING MODE

(75) Inventors: Toshihiro Hamamura, Yokohama (JP); Toshiyuki Tanaka, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 658 days.

(21) Appl. No.: 11/728,523

(22) Filed: Mar. 26, 2007

(65) Prior Publication Data

US 2007/0229699 A1 Oct. 4, 2007

(30) Foreign Application Priority Data

Apr. 3, 2006 (JP) .............................. 2006-101425

(51) Int. Cl.
*H04N 5/235* (2006.01)
(52) U.S. Cl. ................. 348/362; 348/208.6; 348/229.1; 348/296
(58) Field of Classification Search ..... 348/207.99–376
See application file for complete search history.

(56) References Cited

U.S. PATENT DOCUMENTS

| | | | |
|---|---|---|---|
| 7,057,645 B1 * | 6/2006 | Hara et al. ............... | 348/208.6 |
| 7,386,228 B2 * | 6/2008 | Okada ...................... | 396/238 |
| 2003/0103158 A1 * | 6/2003 | Barkan et al. .............. | 348/362 |
| 2003/0202115 A1 * | 10/2003 | Sugimoto et al. .......... | 348/362 |
| 2006/0007327 A1 * | 1/2006 | Nakamura et al. ......... | 348/239 |
| 2009/0091645 A1 * | 4/2009 | Trimeche et al. ........... | 348/273 |
| 2009/0220173 A1 * | 9/2009 | Wajs ......................... | 382/284 |

FOREIGN PATENT DOCUMENTS

| | | | |
|---|---|---|---|
| JP | 2003-319269 | * | 11/2003 |
| JP | 2003-319269 A | | 11/2003 |
| JP | 2004-222109 A | | 8/2004 |

OTHER PUBLICATIONS

Office Action established for CN200710091632.3.
Office Action established for JP2006-101425.

* cited by examiner

*Primary Examiner*—Tuan Ho
*Assistant Examiner*—Kent Wang
(74) *Attorney, Agent, or Firm*—Drinker Biddle & Reath LLP (57) ABSTRACT

An apparatus and method that can maintain the number of photographed images obtained per second (frame rate) while ensuring sufficient exposure of a subject. The photographing apparatus and method can include an exposure portion for repeatedly performing an exposure at intervals of a predetermined unit exposure time, an image data storing portion temporarily storing unit image data generated by the exposure of the exposure portion, and an image combiner reading and combining a group of unit image data corresponding to a predetermined exposure time from the image data storing portion in synchronization with a photographing start timing of a continuous photographing period that is set in advance, to generate a combined image.

20 Claims, 7 Drawing Sheets

PHOTOGRAPHING APPARATUS AND PHOTOGRAPHING METHOD FOR EXPOSURE CONTROL DURING CONTINUOUS PHOTOGRAPHING MODE

CROSS-REFERENCE TO RELATED PATENT APPLICATIONS

This application claims the benefit of Japanese Patent Application No. 2006-101425, filed on Apr. 3, 2006, in the Japan Patent Office, the disclosure of which is incorporated herein in its entirety by reference.

BACKGROUND OF THE INVENTION

1. Field of the Invention

The present invention relates to a photographing apparatus and a photographing method, and more particularly, to a photographing apparatus and method that can maintain a desired number of photographed images per second or a desired frame rate while ensuring sufficient exposure of a subject.

2. Description of the Related Art

Some photographing apparatuses have a photographing mode that can allow the photographing apparatus to continuously photograph a plurality of images with a photographing operation. Hereinafter, the photographing mode for photographing a plurality of images continuously will be referred to as a continuous photographing mode. For example, a photographing apparatus may photograph a plurality of images per second by fixing a shutter speed for each photographed image.

In addition, some photographing apparatuses have a photographing mode, in which a moving picture can be taken by recording a plurality of images per second, when a shutter button is pushed. Hereinafter, the photographing mode for taking a moving picture will be referred to as a moving picture mode. A frame rate is the number of times per second that the output image is updated, and a unit of the frame rate is fps (frame per second). For example, a case where the images are displayed and updated 30 times per second has a frame rate of 30 fps.

However, the conventional photographing apparatus performing the continuous photographing mode and the moving picture mode has the following problems.

Figure 1:
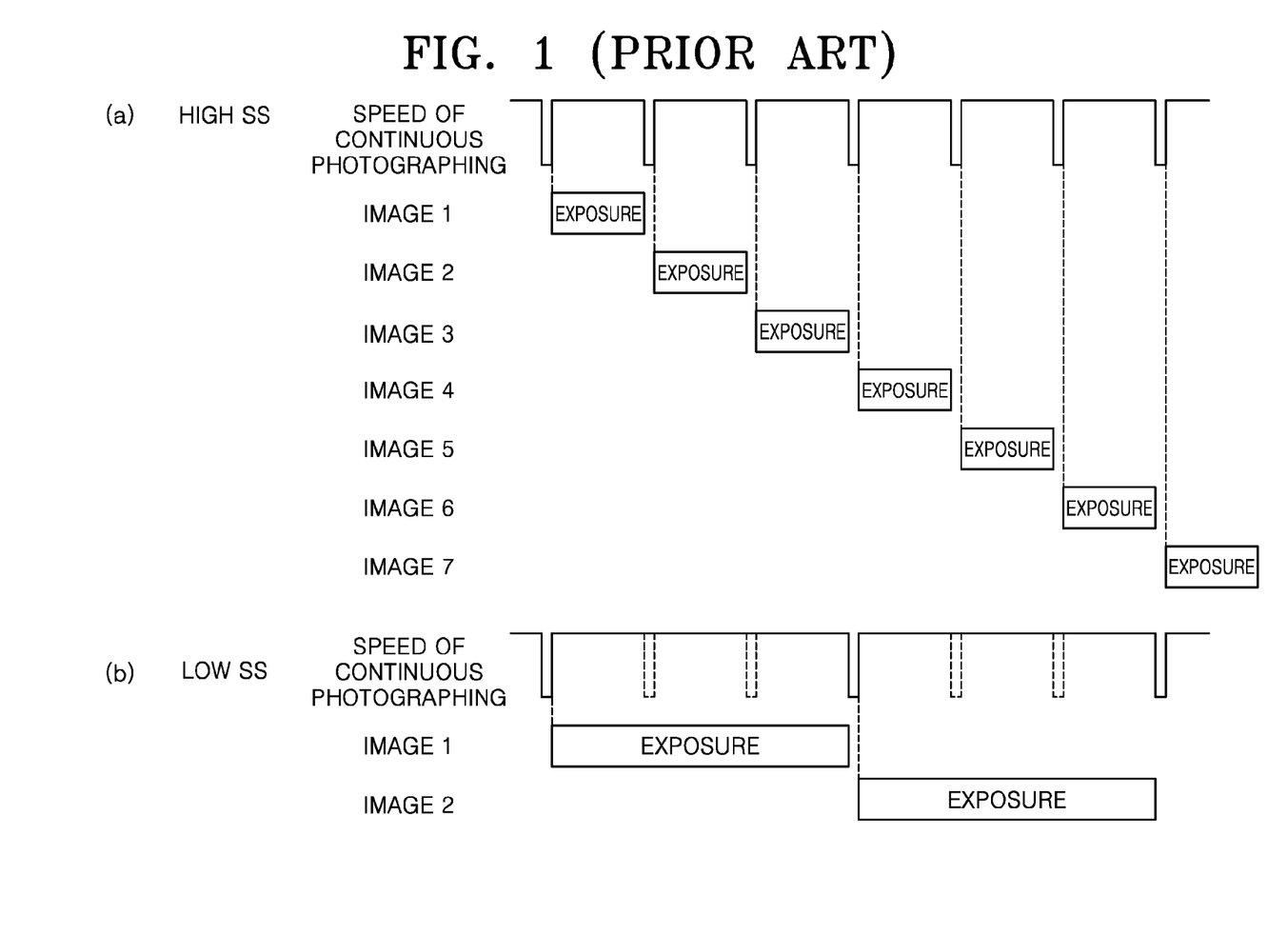
FIGS. 1(a) and 1(b) are conceptual diagrams illustrating a method of photographing a plurality of continuous images in a conventional photographing apparatus having a continuous photographing mode and a moving picture mode.

FIGS. 1(a) and 1(b) are conceptual diagrams illustrating an example of what occurs when a plurality of continuous images are photographed in the conventional photographing apparatus capable of performing the continuous photographing mode and the moving picture mode.

In order to increase the number of photographed images per second in the continuous photographing mode, or to increase the frame rate in the moving picture mode, an exposure time is reduced as shown in the high SS (shutter speed) example of FIG. 1(a). However, in order to photograph, for example, 10 images during a second, the shutter speed must be faster than 1/10 second in consideration of the time taken for inputting photographed image data. Therefore, when a subject is dark, for example, at night or indoors, sufficient image data typically cannot be obtained due to lack of exposure in the environment in which the subject is present.

In addition, if the shutter speed is lowered in order to ensure a sufficient exposure amount as shown in the low SS example of FIG. 1(b), the number of photographed images or the frame rate per second is reduced.

In order to solve the above problems, an exposure for a short period of time is taken repeatedly, and images obtained by the exposures are combined at predetermined intervals. Then, the desired shutter speed and the number of photographed images, or the frame rate, can be attained.

An example of a method for taking an exposure for a short period of time repeatedly and combining images obtained by the exposures is disclosed in Japanese Laid-open Patent No. 2003-319269. However, according to this method, an image having a plurality of periods of exposure times is combined, and thus, a plurality of images having the same exposure times are not photographed, or a moving picture having the same exposure times is not photographed. As described above, according to the conventional photographing apparatus, it is difficult to achieve a fast shutter speed and a high number of photographed images, or a high frame rate, simultaneously.

SUMMARY OF THE INVENTION

The embodiments of the present invention provide a photographing apparatus and a photographing method that can maintain a desired number of photographed images per second or a frame rate while ensuring sufficient exposure of a subject.

An embodiment of the present invention therefore provides a photographing apparatus including an exposure portion for repeatedly performing an exposure at intervals of a predetermined unit exposure time, and an image data storing portion for temporarily storing unit image data generated by the exposure of the exposure portion. The apparatus further includes an image combiner for reading and combining a group of unit image data corresponding to a predetermined exposure time from the image data storing portion in synchronization with a photographing start timing of a continuous photographing period that is set in advance, to generate a combined image.

The photographing apparatus may further include a combination image number determiner for determining the number of image data that are to be combined, and a combination interval determiner for determining a timing for generating the combined image. The photographing apparatus may further include a display portion for displaying the combined image, and for updating the displayed image at a predetermined interval. The image combiner may adjust the photographing start timing so that the timing of updating the displayed image on the display portion and the timing of terminating the image combination can coincide with each other.

An embodiment of the present invention also provides a photographing method including the operations of repeatedly taking an exposure for a predetermined unit exposure time, and storing temporarily and sequentially unit image data generated by the exposure. The method further includes the operations of reading a group of the unit image data corresponding to the predetermined exposure time in synchronization with a photographing start timing of a continuous photographing period that is set in advance, and combining the group of unit image data to generate a combined image. The photographing method may further include the operations of determining the number of image data that are to be combined, and setting a timing for generating the combined image.

The photographing method may further include the operations of displaying the combined image and updating the displayed image at predetermined intervals. When combining the group of the unit image data, the photographing start timing may be adjusted so that the timing of updating the displayed image and the timing of terminating the image combination can coincide with each other.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Hereinafter, embodiments of the present invention will be described in detail with reference to the attached drawings. Like reference numerals in the drawings denote like elements.

Figure 2:
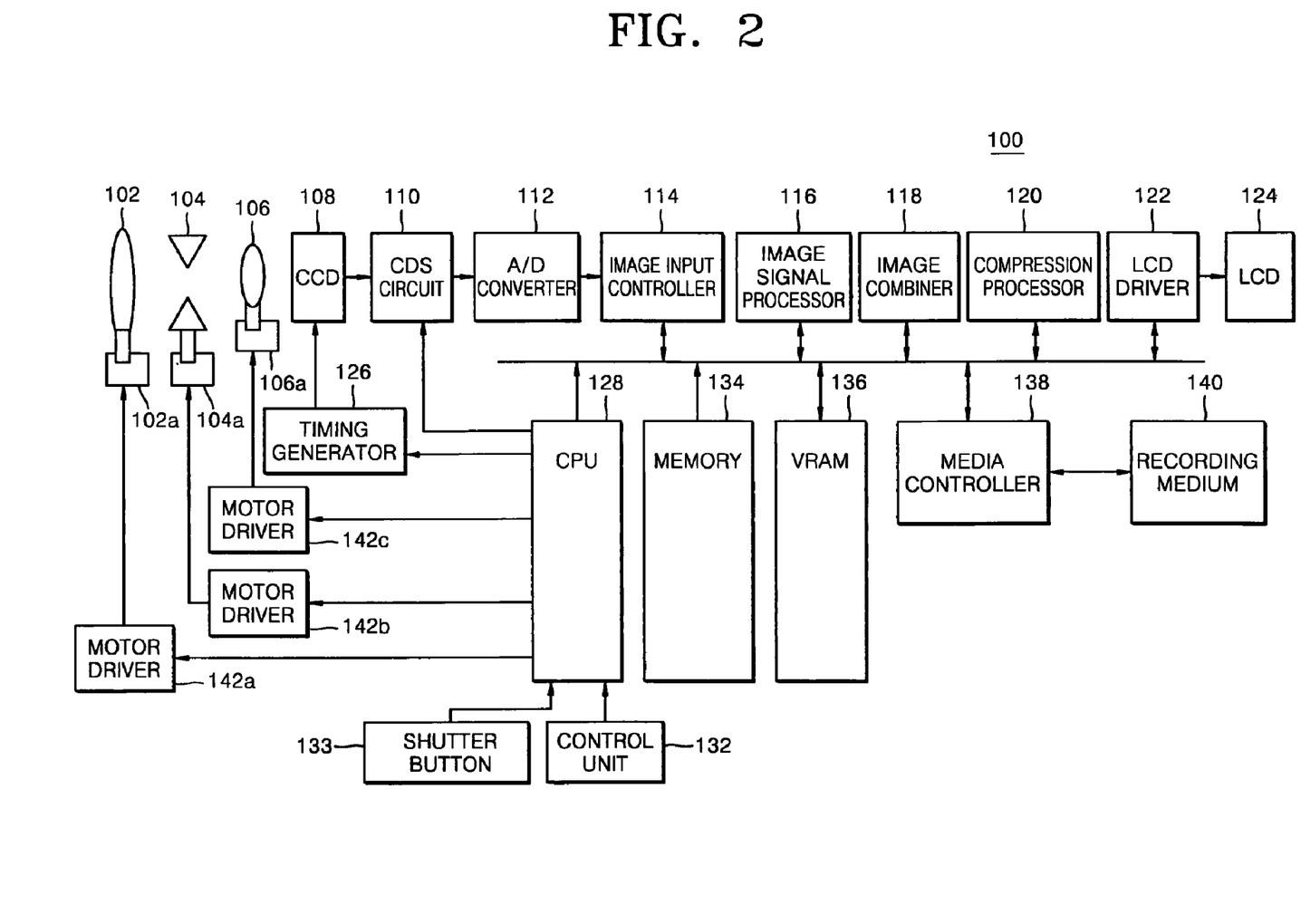
FIG. 2 is a block diagram illustrating an example of a photographing apparatus according to an embodiment of the present invention.

FIG. 2 is a block diagram illustrating an example of a photographing apparatus according to an embodiment of the present invention. As illustrated a photographing apparatus 100, such as a camera or movie camera, according to an embodiment of the present invention includes, for example, a zoom lens 102, an iris 104, a focus lens 106, driving devices 102a, 104a, and 106a, a charge coupled device (CCD) 108, an amplifier-unified correlated double sampling (CDS) circuit 110, an analog/digital (A/D) converter 112, an image input controller 114 and an image signal processor 116. The photographing apparatus 100 further includes, for example, a compression processor 120, a liquid crystal display (LCD) driver 122, an LCD 124, a timing generator 126, a central processing unit (CPU) 128, a control unit 132, a shutter button 133, a memory 134, a Video Random Access Memory (VRAM) 136, a media controller 138, a recording medium 140, and motor drivers 142a, 142b, and 142c.

The zoom lens 102 is moved along an optical axis by the driving device 102a to change a focal distance continuously, and photographs a subject after changing an imaged size of the subject. The iris 104 controls an amount of light incident into the CCD 108 as controlled by the driving device 104a when the subject is photographed. The focus lens 106 adjusts the focus of the subject by being moved in the optical axis direction as controlled by the driving device 106a.

It should also be noted that although one zoom lens 102 and one focus lens 106 are shown, two or more zoom lenses 102 and two or more focus lenses 106 can be employed in the photographing apparatus 100 according to an embodiment of the present invention.

The CCD 108 is an example of an exposure portion, and in this example is a device for changing the light incident from the zoom lens 102, the iris 104, and the focus lens 106 into an electric signal. According to the embodiment shown in FIG. 2, a time for extracting the electric signal is controlled by controlling the incident light using an electronic shutter, however, any suitable type of shutter can be used. That is, according to an embodiment of the present invention, the time for extracting the electric signal can be controlled by controlling the incident light using a meca shutter.

In addition, although the photographing apparatus 100 uses a CCD 108 in this example, a complementary metal oxide semiconductor (CMOS) device or other image sensors can be used according to an embodiment of the present invention. In such an arrangement, the CMOS device can change the image light of the subject into the electric signal faster than the CCD does, and thus, the time for combining images after photographing the subject can be reduced.

The CDS circuit 110 in this example is a circuit including a CDS circuit that can be a sampling circuit which removes noise from the electric signal output from the CCD 108, and an amplifier for amplifying the electric signal from which the noise was removed, with the CDS circuit and amplifier being configured as a single unit. In the embodiment shown in FIG. 2, the photographing apparatus 100 includes the circuit, in which the CDS circuit and the amplifier are integrally formed with each other. However, the CDS circuit and the amplifier can be formed as separate circuits.

As can be appreciated by one skilled in the art, the A/D converter 112 converts the electric signal generated by the CCD 108 into a digital signal to form a raw image of the subject. The image input controller 114 controls an operation of inputting the raw image data generated by the A/D converter 112 into the memory 134. The image signal processor 116 adjusts an amount of gain of light or adjusts a white balance of the electric signal output from the CCD 108 or the image combined in the image combiner 118.

The image combiner 118 combines the plurality of photographed images. Specifically, the image combiner 118 reads a group of unit image data from the memory 134 in synchronization with a photographing initializing time of a continuous photographing period that is set in advance, and generates a combined image. In this example, the predetermined continuous photographing period may be a period according to the photographing mode that is previously set by the user using the control unit 132, or a period set by the user in advance using the control unit 132. The image combiner 118 may be a circuit for combining the images, or configured as a computer program for combining the images.

The compression processor 120 compresses the image combined in the image combiner 118 into image data having an appropriate format. The compression format of the image may be a reversible format or a non-reciprocal format. For example, the image can be compressed as a joint photographic experts group (JPEG) format or a JPEG2000 format.

The LCD 124 is an example of a display unit, and displays a live view of the subject and field of view before photographing, a screen for setting the photographing apparatus 100, or the photographed image itself. The image data or the information for setting the photographing apparatus 100 can be displayed on the LCD 124 using the LCD driver 122, and the display on the LCD 124 is updated at a predetermined period.

As would be understood by one skilled in the art, the timing generator 126 inputs a timing signal into the CCD 108. The shutter speed is determined by the timing signal from the timing generator 126. That is, driving of the CCD 108 is controlled by the timing signal from the timing generator 126, and the imaged light is incident from the subject to the CCD 108 so that an electric signal that is the basis for generating the image data is generated.

The CPU 128 performs operations and issues commands for controlling the signals with respect to the CCD 108 or the CDS circuit 110, and performs operations and issues commands for controlling the operating system with respect to the operation of the control unit 132. The embodiment shown in FIG. 2 includes one CPU 128, however, the commands for the signals and the commands for the operating system can be performed by separate CPUs.

The control unit 132 includes a member for controlling processes of the photographing apparatus 100, or for controlling various settings in the photographing operation. The member disposed on the control unit 132 includes, for example, a power button, a cross key button and a select button for selecting photographing mode and setting parameters relating to photographic effects.

The shutter button 133 is used to photograph the image. Typically, the subject is focused during a state where the shutter button 133 is half-pushed (the S1 state), and is photographed when the shutter button 133 is completely pushed (the S2 state).

The photographing apparatus 100 according to the embodiment shown in FIG. 2 has a continuous photographing mode and/or a moving picture mode. In the continuous photographing mode, a plurality of images are photographed when a photographer (user) maintains the S2 state of the shutter button 133, and in the moving picture mode, recording of the moving picture is initiated after the user pushes the shutter button 133 once to be in the S2 state.

The memory 134 is an example of an image data storage, and temporarily stores the photographed image or the image combined by the image combiner 118. The memory 134 has a storage capacity that can store a plurality of images, and the image input controller 114 controls the reading/writing of the images from/onto the memory 134. The VRAM 136 maintains the contents displayed on the LCD 124, and the resolution of the LCD 124 or the maximum number of color emissions depends on, for example, a capacity of the VRAM 136.

The recording medium 140 is an example of an image data recording unit, and records the photographed image or the image combined by the image combiner 118. The media controller 138 controls the input/output of data into/from the recording medium 140. A card type recording medium, that is, a memory card for recording data on a flash memory, can be used as the recording medium 140. or any other suitable recording medium can be employed.

The motor drivers 142a, 142b, and 142c control the driving devices 102a, 104a, and 106a that operate the zoom lens 102, the iris 104, and the focus lens 106. That is, when the zoom lens 102, the iris 104, and the focus lens 106 are driven using the motor drivers 142a, 142b, and 142c, the image size of a subject, the light amount, and focus can be adjusted.

An inner structure of the CPU according to the embodiment shown in FIG. 2 will be described with reference to FIG. 3.

Figure 3:
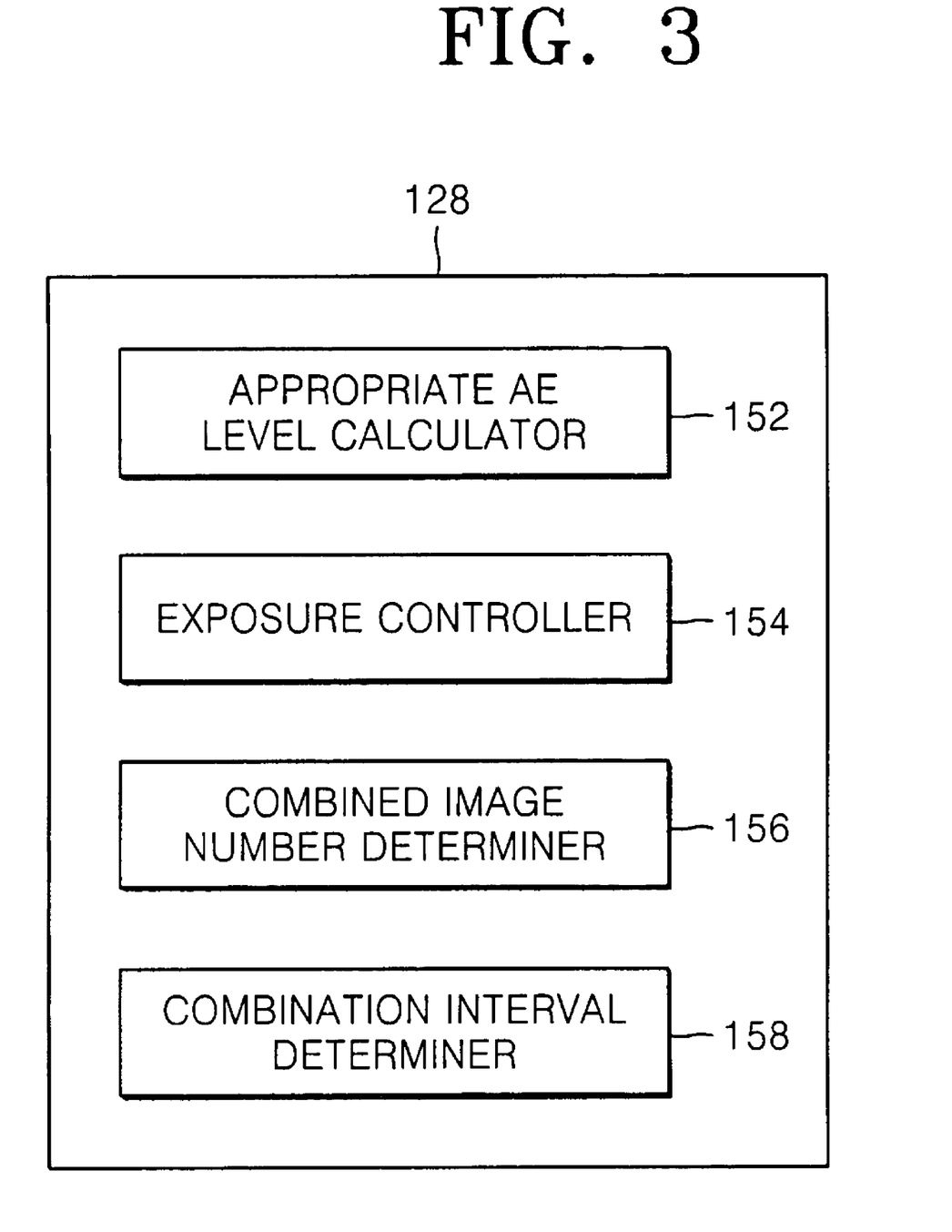
FIG. 3 is a block diagram illustrating an example of a central processing unit (CPU) of the photographing apparatus of FIG. 2.

FIG. 3 is a block diagram of an example of an inner structure of the CPU 128 according to the embodiment of the present invention. As shown, the CPU 128 includes, for example, an appropriate automatic exposure (AE) level calculator 152, an exposure controller 154, an image combination number determiner 156, and a combination interval determiner 158.

The appropriate AE level calculator 152 obtains an exposure value (EV) by performing an automatic exposure calculation in the photographing apparatus 100. Based on the obtained EV, an appropriate iris value and shutter speed are determined. The EV is adjusted by changing the iris value or the shutter speed when it is assumed that EV is 0 for appropriate exposure when the iris value is F1 and the shutter speed is 1 second. The EV can be calculated using, for example, an equation of $EV=\log 2(2F/T)$, in which F is the iris value and T is the shutter speed. Therefore, the EV increases when the shutter speed increases for the same iris value, and the EV increases when the iris value increases for the same shutter speed. In addition, the appropriate AE level calculator 152 calculates an automatic focus (AF) evaluation value for the image and an AE evaluation value.

The exposure controller 154 determines a unit exposure time when the subject is photographed, based on the exposure time according to the shutter speed that is calculated in the appropriate AE level calculator 152. Based on the determined unit exposure time, the incident time of the imaged light from the subject on the CCD 108 is controlled.

The image combination number determiner 156 determines the number of images to be combined based on an iris value and shutter speed as determined by the appropriate AE level calculator 152, the shutter speed determined by the photographer using the control unit 132, or the number of photographed images per second or the frame rate as determined by the photographer using the control unit 132. For example, when the unit exposure time of the CCD 108 is 1/60 second and the shutter speed for obtaining sufficient exposure is determined to be 1/20 second as a result of the automatic exposure calculation made by the appropriate AE level calculator 152, the image combination number determiner 156 determines the number of images that are to be combined as 3 images.

The combination interval determiner 158 determines the interval for combining the images in the image combiner 118 based on an iris value and shutter speed as determined by the appropriate AE level calculator 152, the shutter speed determined by the photographer using the control unit 132, or the number of photographed images per second or the frame rate as determined by the photographer using the control unit 132. For example, when the unit exposure time of the CCD 108 is 1/60 second and the number of photographed images per second is determined to be 20, the interval for continuous photographing is 1/20 second. Therefore, the image combiner 118 generates one combined image having a total duration of 1/20 second, based on the timing for generating three images in the CCD 108 (e.g., 3 images×1/60 seconds per image).

The combined image can be generated by sequentially combining unit image data, whenever unit image data is generated. However, the combined image may be generated by combining the image data once after a predetermined number of unit image data have been generated, or in any other suitable manner.

A method of photographing images according to an embodiment of the present invention will now be described with reference to FIGS. 4 and 5.

Figure 4:
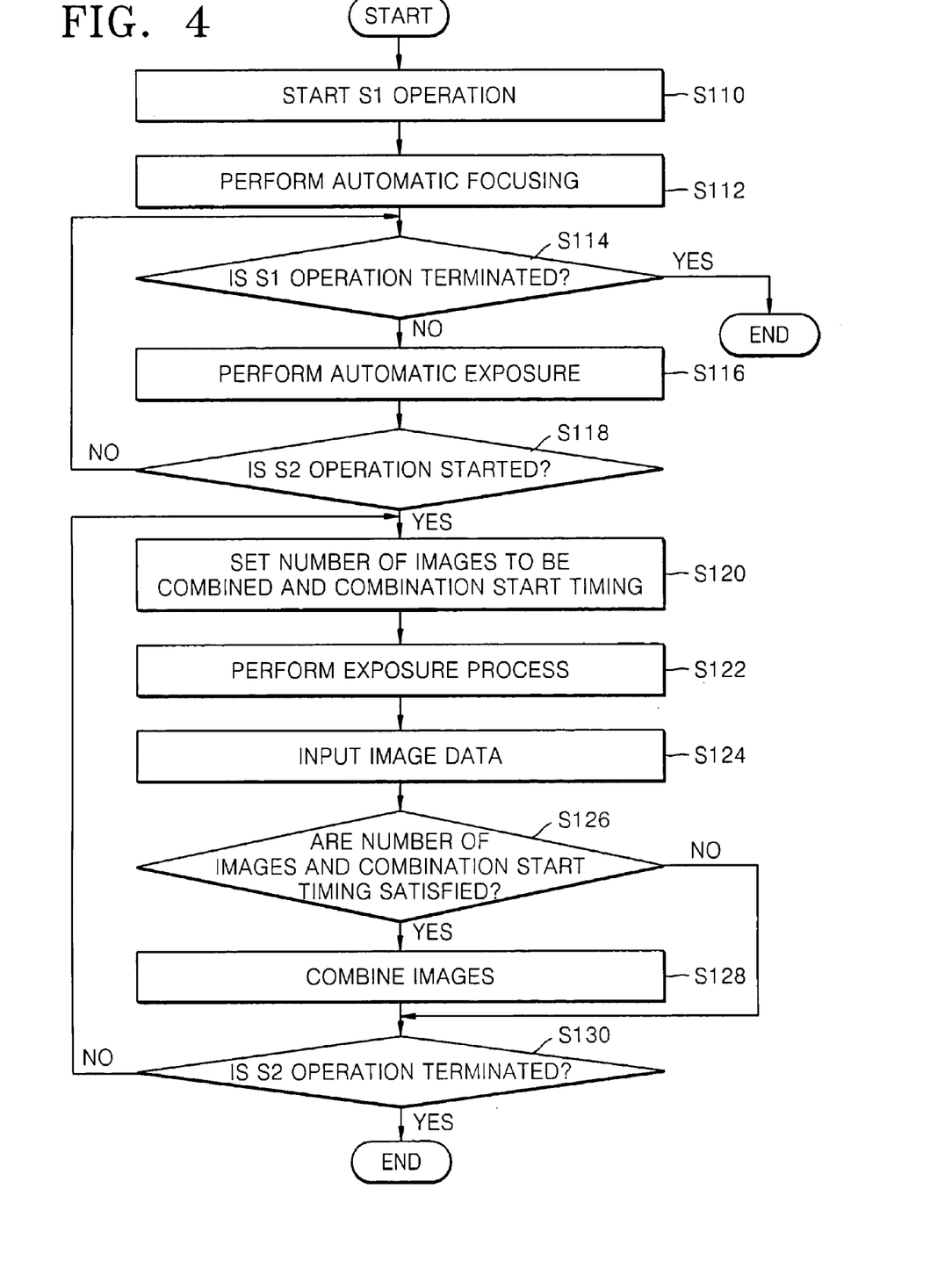
FIG. 4 is a flow chart illustrating an example of processes for photographing images according to an embodiment of the present invention.
Figure 5:
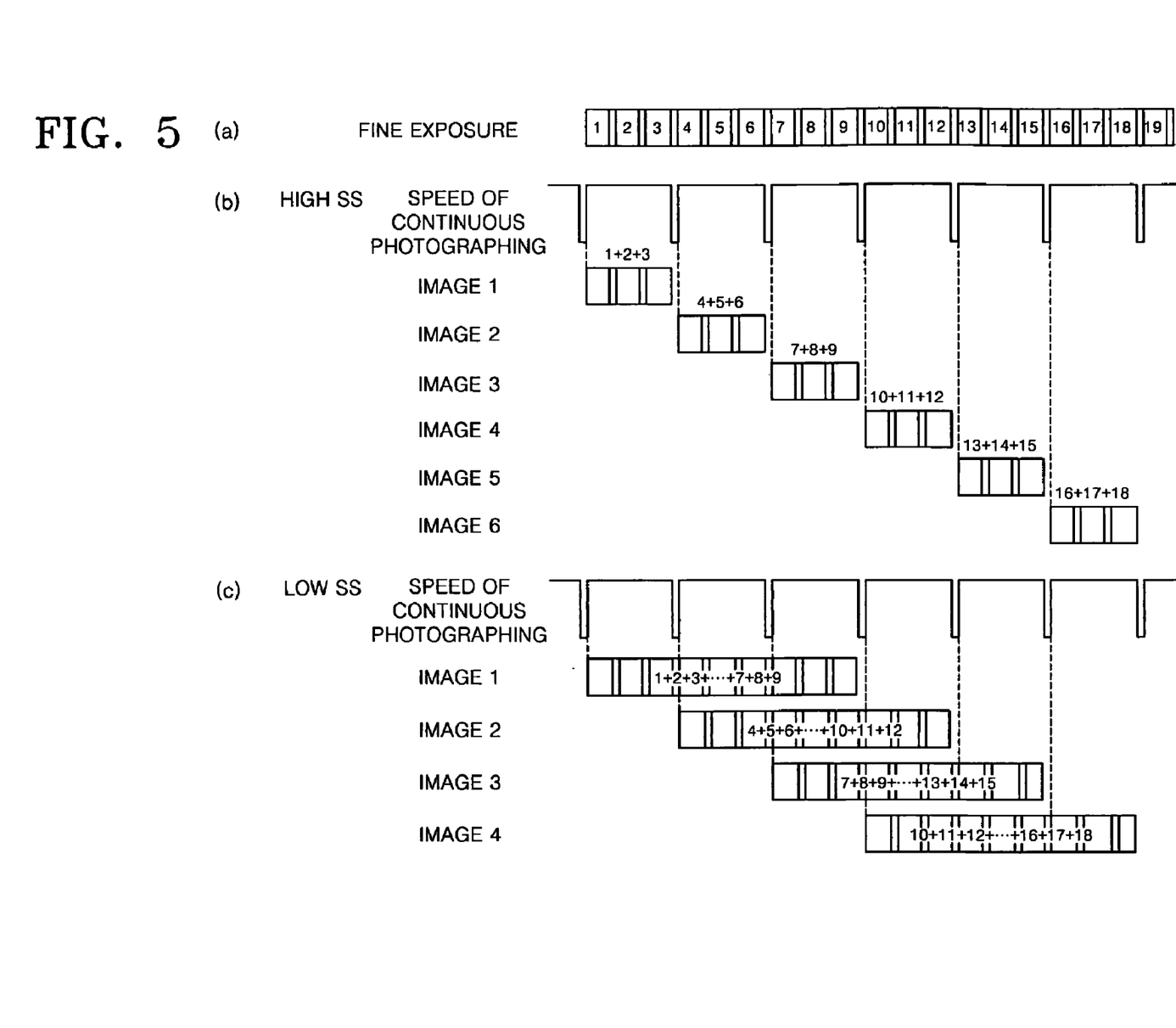
FIG. 5 is a diagram illustrating an example of a manner in which photographing occurs according to the embodiment of the present invention shown in FIG. 2.

FIG. 4 is a flow chart illustrating an example of processes for photographing images according to the embodiment of the present invention shown in FIG. 2. When a plurality of continuous images are to be photographed using the photographing apparatus 100, the photographing mode is set to the continuous photographing mode by using the control unit 132. When the setting of continuous photographing mode is completed, the shutter button 133 is pushed to be in the S1 state in step S110, and then, an automatic focusing for the subject is performed in step S112 due to the shutter button being in the S1 state.

When the subject is focused, the photographer can take his or her hand off of the shutter button 133 to terminate the S1 state. Step S114 determines whether the S1 state has been terminated. When the S1 operation has been terminated, the photographing operation is completed. However, if the S1 state is not terminated, the appropriate AE level calculator 152 performs an automatic exposure process to determine the shutter speed and the iris value in step S116.

It is assumed that the iris value is F4.0 and the exposure time is 1/20 second as a result of the automatic exposure calculated by the appropriate AE level calculator 152. Moreover, according to the photographing method of this embodiment, the exposure time is determined from the result of automatic exposure. However, the shutter speed and/or the iris value can be determined by the photographer.

When the shutter speed and the iris value are determined, the photographer pushes the shutter button 133 again, and the CPU 128 determines whether the shutter button 133 is in the S2 state in step S118. If the shutter button 133 is not in the S2 state, the processing returns to step S114 where it is determined whether the S1 state has been terminated. When it is determined in step S118 that the shutter button 133 is in the S2 state, the number of images to be combined is determined by the image combination number determiner 156 based on the shutter speed determined in step S116, and the combination interval determiner 158 sets the timing of generating the combined image in step S120.

For example, when the unit exposure time of the CCD 108 is 1/60 second and the shutter speed for obtaining a sufficient exposure for photographing the subject is determined to be 1/20 second as a result of the automatic exposure in the appropriate AE level calculator 152, the image combination number determiner 156 determines the number of images that are to be combined to be 3. In addition, if the number of photographing images per second is determined as 20, the combination interval determiner 158 instructs the image combiner 118 to combine the unit image data for 1/20 second, which corresponds to the timing of generating the three unit image data in the CCD device 108.

When the number of images to be combined and the combined image generation time are set in step S120, the imaged light from the subject is incident into the CCD 108 for a predetermined time to perform the exposure in step S122. According to this example, the image light from the subject is incident into the CCD 108 for 1/60 second to perform the exposure.

When the exposure is completed, the unit image data is input into the memory 134 from the CCD 108 using the image input controller 114 in step S124. The input image data is temporarily stored in the memory 134.

After inputting the unit image data, it is determined whether the number of image to be combined and the combination timing determined in S120 have been reached in step S126. When the number of image to be combined and the combination timing determined in step S120 are completed, groups of unit image data are extracted from the memory 134, and pixels in each of the unit image data are added to each other in the image combiner 118 to combine the unit image data in step S128.

FIGS. 5(a) and 5(b) are conceptual diagrams illustrating the photographing method according to the embodiment shown in FIGS. 2-4 as discussed above with regard to steps S118 through S128 in particular. In FIG. 5(a), fine exposure refers to the exposure of the CCD 108. In addition, according to this example, the exposure is performed for 1/60 second. The exposures are numbered sequentially from the time when the S2 status of the shutter button 133 starts.

In this example, the combination interval determiner 158 determines that the combined image is generated at 1/20 second interval. That is, whenever the unit image data is generated in the CCD 108, the image combiner 118 combines the unit image data sequentially, and thus, one combined image is generated even though three unit image data are generated.

FIG. 5(b) illustrates an example of a sequence of combining images in a high SS. A first combined image is generated by combining unit image data generated in the first exposure through third exposure sequentially. In addition, a second combined image is generated by combining unit image data generated in the fourth exposure through sixth exposure, and a third combined image is generated by combining unit image data generated in the seventh exposure through ninth exposure. Likewise, fourth, fifth, and sixth combined images can be generated by combining three unit image data sequentially.

As described above, the continuous photographing in the continuous photographing mode can be performed by combining the unit image data generated in predetermined unit exposure times. However, in some circumstances, the sufficient exposure is not obtained without decreasing the shutter speed. For example, it is assumed that the shutter speed is determined to be 3/20 seconds as a result of the automatic exposure of the appropriate AE level calculator 152. In the conventional photographing apparatus method, when the shutter speed is 3 times longer than a reference speed, the number of photographed images per second is reduced to 1/3 of the reference. However, according to the embodiment of the present invention shown in FIGS. 2-4, the timing for generating the combined image need not be changed, and the number of images that are to be combined can be increased. Therefore, the same image that is obtained by the increased shutter speed can be obtained.

In FIG. 5(c), low SS shows the combination sequence where the number of unit image data combined to obtain a combined image increases. Since the shutter speed is three times longer than that of the high SS, the number of unit image data to be combined should be increased by three times, that is, to 9. Therefore, a first combined image is generated when unit image data generated by ninth fine exposure is input. The combined image is generated by combining unit image data generated in the first exposure through ninth exposure sequentially.

According to the conventional photographing technique, the next unit image data cannot be obtained until 3/20 seconds elapses again. However, according to the embodiment of the present invention as shown in FIGS. 2-4, the exposure for 1/60 second is repeated, and thus, the next unit image data can be obtained before 3/20 seconds elapses. That is, a second combined image can be generated by combining unit image data generated in the fourth exposure through twelfth exposure sequentially. Likewise, third and fourth combined images can be generated using the above process, and thus, the photographing can be performed without changing the number of photographed images per second even when the shutter speed is decreased.

Moreover, in the above example, the unit image data are sequentially combined to generate a combined image. However, a combined image can be generated by combining the unit image data once after a predetermined number of unit image data are generated. In addition, when the image combiner 118 combines the unit image data, a dislocation between the unit image data generated due to shaking (e.g., due to shaking of the photographer's hand) can be detected and the unit image data can be combined so as to remove the dislocation.

When the unit image data are obtained as discussed above, it is determined in step S130 whether the photographer terminates the S2 state of the shutter button 133. If the photographer does not terminate the S2 state, the processing repeats at step S120 and the exposure process is performed continuously in step S122 as discussed above. However, if the S2 state of the shutter button 133 is terminated, the exposure process is completed. The generated photographed images undergo a gradation process or a color tone process in the image signal processor 116, and a compression process in the compression processor 120, and then are stored in the recording medium 140 by the media controller 138.

As described above, the photographing mode is set as the continuous photographing mode to photograph a plurality of images continuously. However, the photographing mode can be set as the moving picture mode, and then, the frame rate is set instead of the number of photographed images per second.

In addition, according to the embodiment of the present invention described above, a group of unit image data generated during fine unit exposure times are combined. Hence, the number of photographed images per second (frame rate) can be maintained even in a case where the shutter speed is be slowed in order to ensure the sufficient exposure amount.

A photographing method according to another embodiment of the present invention will now be described with reference to FIGS. 6 and 7, and differences from the embodiment described above will be discussed.

In the embodiment described with regard to FIGS. 2-5(c), the group of unit image data obtained by performing the exposure process is combined. Hence, the number of photographed images per second (frame rate) can be maintained with the slow shutter speed. The embodiment shown in FIGS. 6 and 7 provides a photographing apparatus and a photographing method that can perform a live view operation that displays images to the photographer using a screen included in the photographing apparatus.

Figure 6:
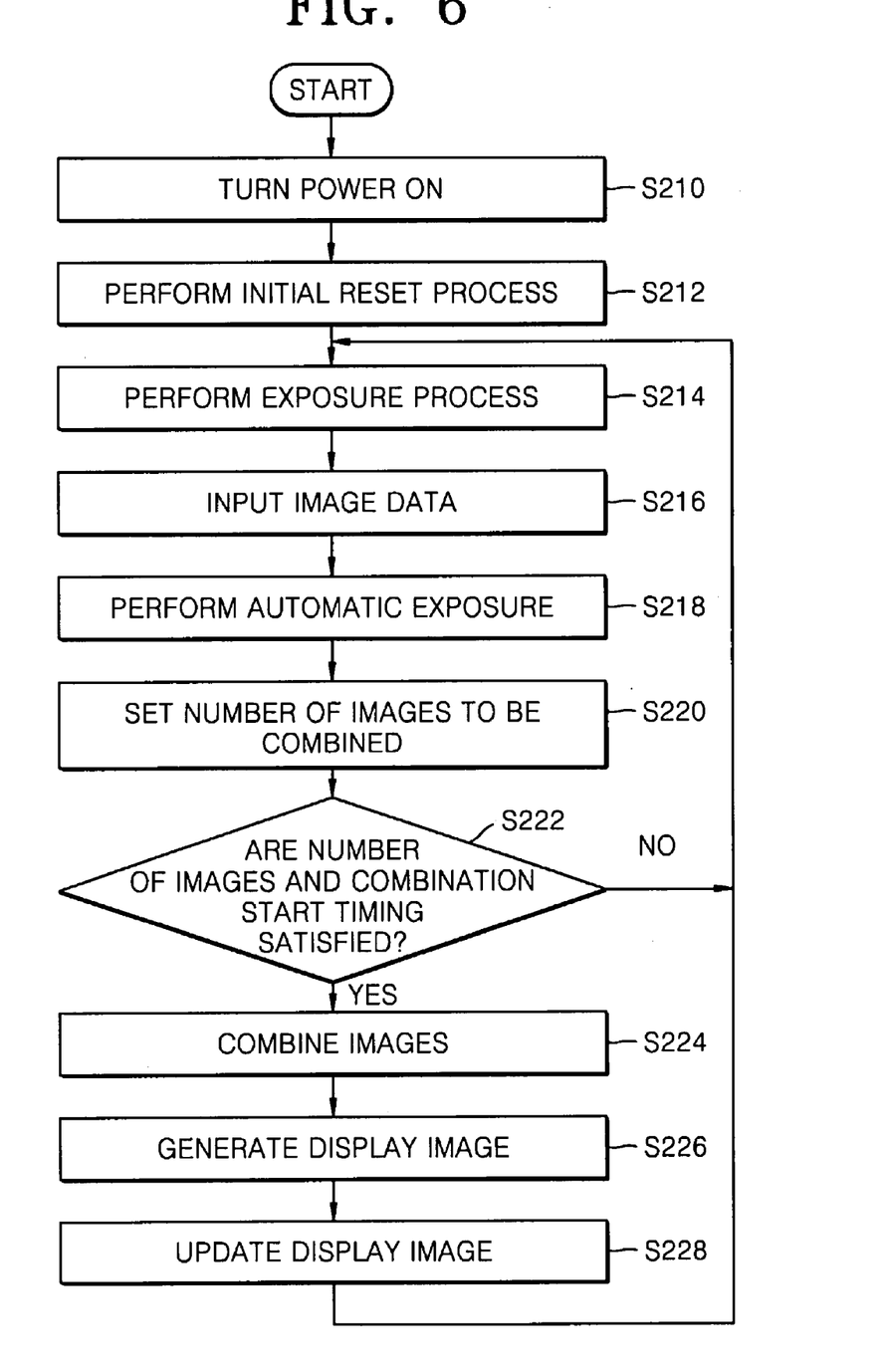
FIG. 6 is a flow chart illustrating an example of operations for live viewing according to an embodiment of the present invention.
Figure 7:
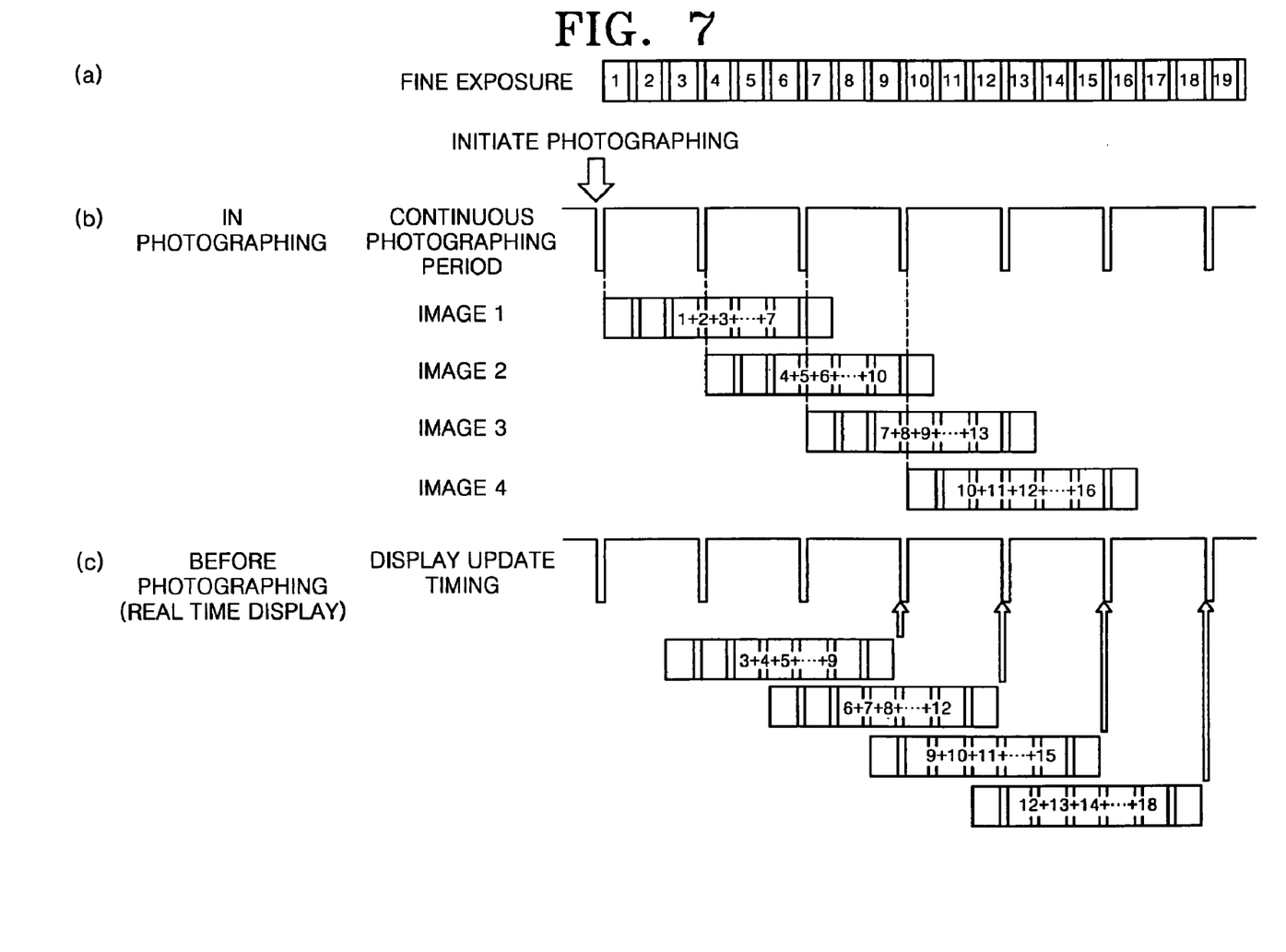
FIG. 7 is a diagram illustrating an example of a live view operation according to an embodiment of the present invention as shown in FIG. 6.

The structures of the photographing apparatus and the CPU according to the embodiment shown in FIGS. 6 and 7 are the same as or similar to the photographing apparatus 100 and the CPU 128 a discussed above, and therefore, detailed descriptions for those components are omitted. A live view operation using the structure of the photographing apparatus 100 will now be described.

FIG. 6 is a flow chart illustrating an example of operations relating to a live view process according to an embodiment of the present invention.

Power is turned on by controlling a power switch included in the control unit 132 of the photographing apparatus 100 in step S210. The photographing apparatus 100 performs an initial reset operation in step S212 and stands by the operation of the photographer. When the initial reset operation is performed, the photographing apparatus 100 starts the live view operation. When the live view starts, the exposure of the CCD 108 is initiated in step S214.

The imaged light of the subject incident on the CCD 108 generates a unit image data through the CDS circuit 110 and the A/D converter 112, and the generated unit image data is converted into the display image to be displayed on the LCD 124. When the display image is displayed on the LCD 124, the gradation process or the color tone process in the image signal processor 116, and the compression process of the compression processor 120 may be performed. The image displayed on the LCD 124 is updated after a predetermined period. The number of times the display image is updated per second can be equal to the frame rate, and the unit of the frame rate is frame per second (fps). For example, when the image is displayed by being updated 30 times per second, the frame rate is 30 fps. If the frame rate is instead set as 20 fps, the image displayed on the LCD 124 is updated at 1/20 second intervals.

When the exposure is started in step S124, the unit image data obtained by the exposure is input using the image input controller 114 in step S216. The input unit image data is temporarily stored in the memory 134. The appropriate AE level calculator 152 performs the automatic exposure using the input unit image data step S218. The image combination number determiner 156 determines the number of images that are to be combined using the exposure time obtained by the automatic exposure of the appropriate AE level calculator 152 in step S220.

For example, when the unit exposure time of the CCD 108 is 1/60 second and the appropriate exposure time obtained by the automatic exposure of the appropriate AE level calculator 152 is 7/60 seconds, the image combination number determiner 156 determines the number of unit image data to be combined as 7. By combining 7 unit image data, each obtained by the exposure for 1/60 second, an image that is equivalent to the image obtained by an exposure for 7/60 seconds can be obtained.

When the number of unit image data to be combined images is determined in step S220, it is determined whether the determined number of unit image data are photographed and whether it is the combination timing in step S222. If the number of unit image data to be combined and the combination timing are satisfied, a combined image is generated in step S224 by combining the number of unit image data determined in S220.

Accordingly, the image combiner 118 adjusts the photographing start timing so that the display update timing of the LCD 124 can coincide with the combination timing of the image combiner 118. In addition, the combined image is generated by combining the unit image data whenever the unit image data are generated. However, the combined image can be generated by combining the predetermined number of unit image data only once, or any suitable number of times.

FIGS. 7(a), 7(b) and 7(c) are conceptual diagrams illustrating the live view operation according to the embodiment of the present invention discussed with regard to FIG. 6. The fine exposure of FIG. 7(a) refers to the exposure of the CCD 108, and in this example, the exposure is performed for 1/60 second. The exposure processes are numbered sequentially from the time when the live view operation starts.

As shown in FIG. 7(b), the first unit image data that is to be combined is the unit image data generated when the photographing process starts, that is, when the S2 state of the shutter button 133 starts, according to the embodiment discussed above with regard to FIGS. 2-5(c). However, as shown in FIG. 7(c), the final unit image data that is combined satisfies the number of combination determined in step S220 and is closest to the update timing of the LCD 124, so that a time difference between the actual image and the image displayed on the LCD 124 can be minimized. That is, the first image displayed on the LCD 124 is formed by combining seven unit image data generated by the third fine exposure through ninth fine exposure that is close to the update timing of the LCD 124.

When the combined image is generated by combining the unit image data sequentially, the image signal processor 116 generates a display image that will be displayed on the LCD 124 from the combined image in step S226. The display image in this example is an image corresponding to the size of the LCD 124. The combined image can be displayed on the LCD 124 without generating the display image. In addition, the image displayed on the LCD 124 is updated by the display image generated by the image signal processor 116 in step S228.

When the update of the image displayed on the LCD 124 is completed, the exposure is performed in step S214. However, if it is determined that the number of unit image data to be combined and the combination timing are not satisfied in step S222, the unit image data are not combined, but the exposure process is repeated as discussed above beginning at step S214. Afterward, the combined image is generated and the display image for the LCD 124 is updated every 1/20 seconds, for example.

As described above, according to this embodiment, the group of unit image data generated by short unit exposures is combined. Hence, the image can be updated with a period that is shorter than the exposure time required to recognize the subject in the live view operation, which displays the image of subject before the photographing. Then, the combined image can be displayed on the LCD 124, that is, the display portion, so that the time difference between the displayed image and the actual subject can be minimized.

As can be appreciated by one skilled in the art, some of the components of the photographing apparatus 100 can be embodied in computer programs recorded in the photographing apparatus 100, and/or in hardware such as a microprocessor for performing functions of the components of the photographing apparatus. Also, as described above, the number of photographed images per second (frame rate) can be maintained while ensuring sufficient exposure of the subject.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A photographing apparatus comprising:
    an exposure portion for repeatedly performing an exposure at intervals of a predetermined unit exposure time;
    an image data storing portion for temporarily storing unit image data generated by the exposure of the exposure portion; and
    an image combiner for reading and combining a group of unit image data corresponding to a predetermined exposure time from the image data storing portion in synchronization with a photographing start timing of a continuous photographing period, to generate a combined image, wherein all unit image data exposure times of the group of unit image data are equal.

2. The photographing apparatus of claim 1, further comprising:
    a combination image number determiner for determining the number of image data that are to be combined.

3. The photographing apparatus of claim 2, wherein:
    the combination image number determiner determines the number of image data to be combined based on at least one of an iris value of the photographing apparatus for the exposure, shutter speed of the photographing apparatus for the exposure, a number of photographed images per second, and a frame rate.

4. The photographing apparatus of claim 1, further comprising:
    a combination interval determiner for determining a timing of generating the combined image.

5. The photographing apparatus of claim 1, wherein:
    the continuous photographing period is set in advance of the image combiner performing the reading and combining operations.

6. The photographing apparatus of claim 1, wherein:
    the exposure portion performs the exposure, the image data storing portion performs the storing, and image combiner performs the reading and combining, in a continuous photographing mode of the photographing apparatus.

7. The photographing apparatus of claim 1, wherein:
    the exposure portion performs the exposure, the image data storing portion performs the storing, and image combiner performs the reading and combining, for a moving picture mode of the photographing apparatus.

8. The photographing apparatus of claim 1, further comprising:
    an automatic exposure (AE) level calculator for determining an exposure value for the exposure performed by the exposure portion.

9. The photographing apparatus of claim 1, further comprising:
    a compression processor for compressing the combined image into an appropriate format.

10. A photographing apparatus comprising:
    an exposure portion for repeatedly performing an exposure at intervals of a predetermined unit exposure time;
    an image data storing portion for temporarily storing unit image data generated by the exposure of the exposure portion;
    an image combiner for reading and combining a group of unit image data corresponding to a predetermined exposure time from the image data storing portion in synchronization with a photographing start timing of a continuous photographing period, to generate a combined image; and
    a display portion for displaying the combined image, and updating the displayed image at a predetermined interval,
    wherein the image combiner adjusts the photographing start timing so that the timing of updating the displayed image on the display portion and the timing of terminating the image combination coincide with each other.

11. A photographing method comprising:
    repeatedly performing an exposure for a predetermined unit exposure time;
    storing temporarily and sequentially unit image data generated by the exposure; and
    reading a group of the unit image data corresponding to the predetermined exposure time in synchronization with a photographing start timing of a continuous photographing period, and combining the group of unit image data to generate a combined image,
    wherein all unit image data exposure times of the group of unit image data are equal, and
    wherein the combining are repeatedly performed in a continuous photographing operation in synchronization with the photographing start timing of the continuous photographing period.

12. The photographing method of claim 11, further comprising:
    determining the number of image data that are to be combined.

13. The photographing method of claim 12, wherein:
    the determining step determines the number of image data to be combined based on at least one of an iris value of the photographing apparatus for the exposure, shutter speed of the photographing apparatus for the exposure, a number of photographed images per second, and a frame rate.

14. The photographing method of claim 11, further comprising:
setting a timing of generating the combined image.

15. The photographing method of claim 11, further comprising:
displaying the combined image and updating the displayed image at predetermined intervals, wherein in the combining the group of the unit image data, the photographing start timing is adjusted so that the timing of updating the displayed image and the timing of terminating the image combination can coincide with each other.

16. The photographing method of claim 11, wherein:
the continuous photographing period is set in advance of performing the reading and combining operations.

17. The photographing method of claim 11, wherein:
the exposure, storing, reading and combining operations are performed in a continuous photographing mode of a photographing apparatus.

18. The photographing method of claim 11, wherein:
the exposure, storing, reading and combining operations are performed in a moving picture mode of a photographing apparatus.

19. The photographing method of claim 11, further comprising:
determining an exposure value for the exposure.

20. The photographing method of claim 11, further comprising:
compressing the combined image into an appropriate format.

* * * * *